(12) United States Patent
Haber et al.

(10) Patent No.: US 8,266,439 B2
(45) Date of Patent: Sep. 11, 2012

(54) INTEGRITY VERIFICATION OF PSEUDONYMIZED DOCUMENTS

(75) Inventors: Stuart Haber, New York, NY (US); William G. Horne, Lawrenceville, NJ (US); Tomas Sander, New York, NY (US); Danfeng Yao, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1092 days.

(21) Appl. No.: 11/854,413

(22) Filed: Sep. 12, 2007

(65) Prior Publication Data

US 2009/0070361 A1   Mar. 12, 2009

(51) Int. Cl.
*H04L 9/32* (2006.01)
*H04L 29/06* (2006.01)

(52) U.S. Cl. ........ 713/176; 713/150; 713/168; 713/175; 713/177

(58) Field of Classification Search .................. 713/150, 713/168, 176, 177
See application file for complete search history.

(56) References Cited

U.S. PATENT DOCUMENTS

| 4,881,264 | A * | 11/1989 | Merkle ........................ 713/177 |
| 7,395,436 | B1 * | 7/2008 | Nemovicher ................ 713/193 |
| 2005/0004899 | A1 * | 1/2005 | Baldwin et al. ................... 707/3 |
| 2007/0061579 | A1 * | 3/2007 | De Mello et al. ............. 713/176 |

OTHER PUBLICATIONS

Bellare, M., et al. "Forward Integrity for Secure Audit Logs". Technical report, University of California, San Diego, Nov. 1997.

Casassa, M., et al., "Privacy Enforcement with HP Select Access for Regulatory Compliance", HP Technical Rpt, HPL-2005-10, HP Labs, Hewlett-Packard Company, 2005.

Haber, S., et al., "A Content Integrity Service for Long-Term Digital Archives", IS&T Archiving 2006 Conference, May 23-26, 2006, Ottawa, Canada.

Haber, S., et al., "Efficient signatures schemes supporting redaction, pseudonymization, and data deidentification", in Proc. of ACM Symposium on Information, Computer & Communication Security (ASIACCS '08), Tokyo, Japan, Mar. 2008.

Halevi, S., et al., "Practical and Provably-Secure Commitment Schemes from Collision-Free Hashing", CRYPTO '96 Proc. of the 16th Annual International Cryptology Conference on Advances in Cryptology, Springer-Verlag London, UK,1996, pp. 201-215.

Miyazaki, K., et al., "Digitally Signed Document Sanitizing Scheme with Disclosure Condition Control", IEICE Trans. Fundamentals, Vo. E88-A, No. 1, Jan. 2005.

Office Action dated Oct. 19, 2009, U.S. Appl. No. 11/555,278, filed Oct. 31, 2006.

Schneier, B., et al., "Cryptographic Support for Secure Logs on Untrusted Machines", Proceedings of the 7th USENIX Security Symposium, pp. 53-62, USENIX Press, 1998.

\* cited by examiner

*Primary Examiner* — Edan Orgad
*Assistant Examiner* — Jahangir Kabir

(57) ABSTRACT

One or more methods of generating a pseudonymizable document are described. A method comprises receiving a set of subdocuments and generating a first set of random values wherein each subdocument in the document corresponds to a first set random value. A second set of values is generated based on a subdocument and a corresponding value of the first set random value. A set of pseudonyms is generated wherein each subdocument in the document corresponds to at least one pseudonym of the pseudonym set. A third set of values is generated based on the second set of values and the pseudonym set and a summary value is generated based on the third set of values.

15 Claims, 6 Drawing Sheets

US 8,266,439 B2

INTEGRITY VERIFICATION OF PSEUDONYMIZED DOCUMENTS

RELATED APPLICATIONS

The present application is related to co-pending U.S. patent application titled, "Audit-log Integrity Using Redactable Signatures," having application Ser. No. 11/555,278 and filed on Oct. 31, 2006, the disclosure of which is incorporated herein by reference in its entirety.

BACKGROUND

In some situations, particular words and/or information, e.g., names, dates, phrases, etc., comprising a document may need to be redacted in order to prevent discovery of the particular words and/or information. In particular situations, sensitive and/or classified information may need to be redacted from a document or replaced by a pseudonym prior to release of the document to the public, for example.

Digital signatures or time-stamps are usually used to protect the integrity of documents. But these algorithms do not work on redacted documents, because any change to the document leads to an invalid signature or time-stamp certificate. Conventional signature schemes only allow one to verify the message that is signed by a signer. If the message is modified, for example replacing a subdocument with a pseudonym, the signature is no longer valid.

In existing digital redaction schemes, redacted data elements are removed and replaced with a null character or a black rectangle. In certain applications, a pseudonym would be useful to prevent the disclosure of actual data elements while retaining the context and structure of the document. For example, instead of replacing "Alice" with a null character, a redactor can use "Pseudonym:Paula". If a value (e.g., "Alice") occurs several times in the document or database, the value should always be replaced by the same pseudonym. The reader therefore is able to make connections between occurrences of the pseudonyms, which retains the structure and improves the readability of the redacted document.

A prior approach to pseudonymization is to have the data owner sign (or compute a time-stamp certificate for) each possible pseudonymized document. However, this solution requires the data owner to either be available for signing all the time, or to pre-compute and store an impractical number of documents. Instead, a desirable performance requirement for any new technique for this problem is that the data owner should only need to sign the document once, or a (small) constant number of times, regardless of the size of the entire document.

DESCRIPTION OF THE DRAWINGS

One or more embodiments is illustrated by way of example, and not by limitation, in the figures of the accompanying drawings, wherein elements having the same reference numeral designations represent like elements throughout and wherein.

DETAILED DESCRIPTION

Figure 1:
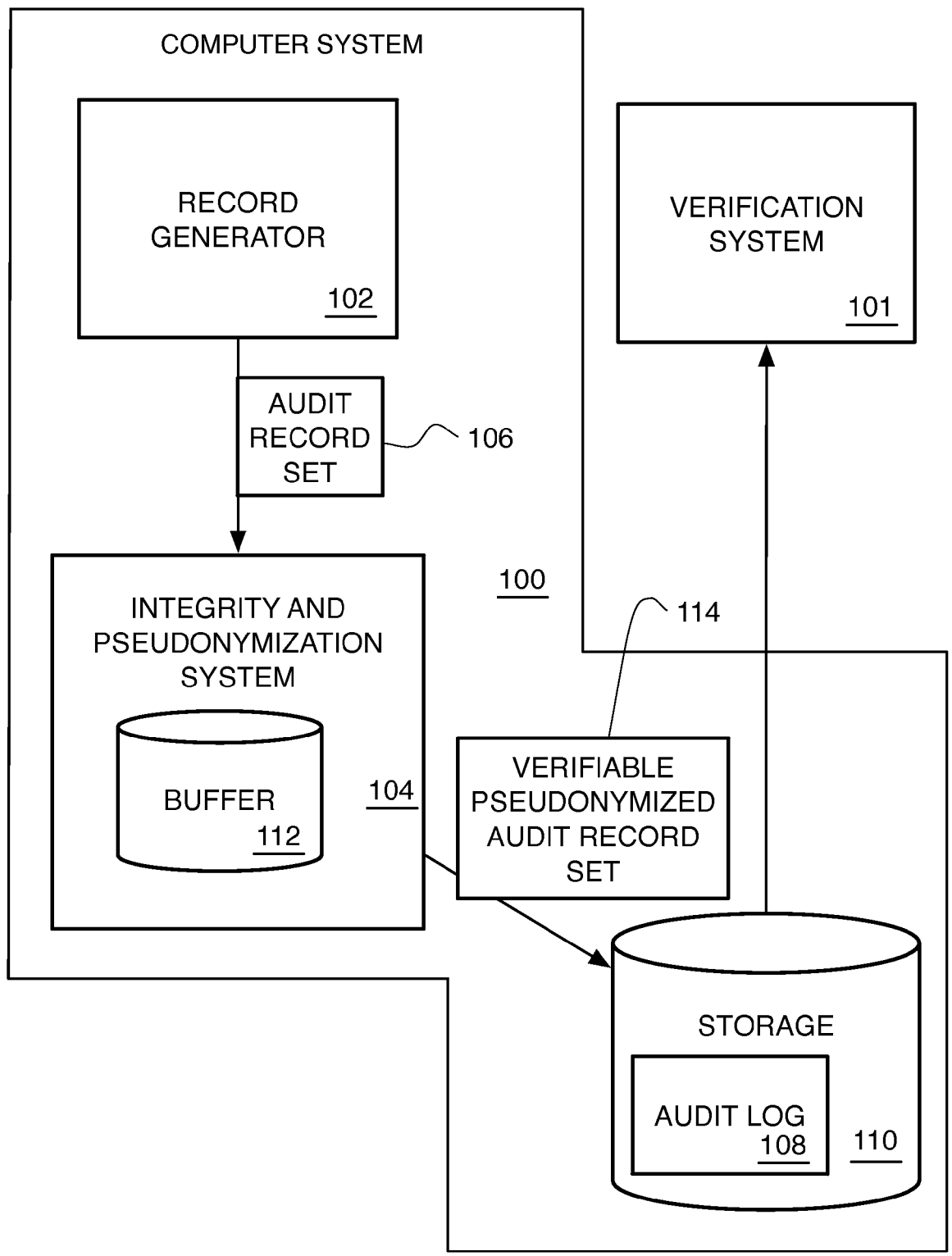
FIG. 1 is a high level block diagram of a portion of a computer system in conjunction with which an audit-log pseudonymization system according to an embodiment may be used to advantage.

In one or more embodiments, a pseudonymization protocol supporting the verification of a pseudonymized document is described. Pseudonyms are chosen, either by the data owner or randomly, and are certified along with the rest of the document. The certification may be by means of an integrity certificate, which may be either a digital signature or a time-stamp certificate. Next, a redactor may replace certain subdocuments by their pseudonyms, and make certain changes in the accompanying data to thereby generate a pseudonymized version of the document. A user who obtains the pseudonymized document from the redactor, along with its integrity certificate and the accompanying data, verifies the integrity of the pseudonymized version.

In order to relieve the data owner of the workload of generating pseudonyms in circumstances where there is no need to specify the exact form, a pseudonymization protocol embodiment allows the third-party redactor to choose pseudonyms after the data owner signs the document. In an embodiment, the redactor can choose and display arbitrary values as pseudonyms.

There are three players in an embodiment of the model: data owner, redactor, and user. In at least some embodiments, there may be more than one data owner, redactor, and user, however, for clarity and simplicity only a single data owner, redactor, and user are described herein. The data owner prepares and authenticates the document once by producing an integrity certificate and some auxiliary information. In at least some embodiments, the data owner need only prepare and authenticate the document a single time. The document, integrity certificate, and auxiliary information are transmitted to the redactor. When the user submits a query for the document, the redactor redacts portions of the document according to the user's access permissions and the redactor's policies. Redacted values are replaced with proper pseudonyms, which may be chosen by the data owner or the redactor depending on the embodiment. In at least some embodiments, the data owner and the redactor may be the same entity. The "integrity" of a pseudonymized document captures the property that the document should only be modified, namely pseudonymized, by a redactor according to the specifications of the data owner.

The integrity certificate computed for a document, and later verified by a user in order to validate the integrity of the document, either in its original form or after being pseudonymized, may be computed and verified according to a digital signature system or according to a digital time-stamping system. However, for clarity and simplicity embodiments using digital signatures are described herein.

The rendering algorithm that displays the document may display pseudonyms in different ways. In some embodiments, pseudonyms may be realized as 160-bit values. In an embodiment, the rendering algorithm could display each pseudonym as a sequence of 27 base-64 encoded characters. In another embodiment, a rendering algorithm might display each pseudonym with more user-friendly values (e.g. "pseudonym1", "pseudonym2", etc.), and give the user the options of clicking on the value or hovering over the value to reveal the actual bit-string.

In an embodiment, let M denote a document to be signed, segmented into a sequence of subdocuments $m_1, m_2, \ldots, m_n$. For example, the subdocuments may correspond to words, sentences, or paragraphs, depending on the level of granularity desired. In at least some embodiments, the present invention may be applied to a set of audit records where individual audit records correspond to the described subdocuments.

The principal requirement for any kind of signature scheme is that it should be computationally infeasible to forge illegitimate signatures. In contrast to conventional signature schemes, in the case of pseudonymizable signatures a precise characterization of the class of modifications to the original document that are considered to be legitimate is needed.

A partial order on pseudonymized documents may be defined, as follows. Let $P_1$ and $P_2$ be two pseudonymized versions of a document M. $P_1$ precedes $P_2$, i.e., $P_1 < P_2$ is true, if and only if the set of subdocuments that are pseudonymized in $P_2$ is a subset of the set of subdocuments that are pseudonymized in $P_1$. In this case, we also write $P_2 > P_1$, or $P_2$ follows $P_1$. For example, given that M contains four subdocuments $m_1, \ldots, m_4$, if $m_1$ and $m_3$ are pseudonymized in $P_1$, and $m_1$ is pseudonymized in $P_2$, then $P_1 < P_2$. The original document precedes any pseudonymized version. In an embodiment, given a document P, a user can obtain a pseudonymized document P' such that P'<P.

In addition to an unforgeability requirement, the operations of pseudonymization introduce requirements for confidentiality and consistency. The confidentiality requirement is that, given a pseudonymized document, no adversary can infer anything about the original version of any of the subdocuments that have been pseudonymized. This property may be captured by requiring that no adversary can distinguish two pseudonymized document P and P' whose corresponding original documents M and M' only differ at a specific subdocument. The term consistency is intended to include the requirement that all occurrences of a particular subdocument of a pseudonymized document should be given the same pseudonym if the document is pseudonymized; and that distinct pseudonymized subdocuments should be given distinct pseudonyms.

One or more embodiments rely on the following cryptographic assumptions and building blocks. Let H denote a particular choice of collision-free hash function. Let S be any digital signature scheme that is secure against existential forgery attacks by an adaptive chosen-message adversary.

Let $C(\cdot,\cdot)$ be a secure commitment scheme, as can be constructed based on the existence of collision-free hash functions. Given any message m and a randomly or pseudorandomly chosen value r, C is used to compute a value $x=C(m, r)$. The computed value is regarded as a probabilistic "commitment" to m that:

*hides all information about m;
 *can be "opened" as a valid commitment to m by revealing r and checking the equation $x=C(m, r)$; and C cannot be opened any other way.

In at least one embodiment, C may be implemented by simply taking $C(m, r)=H(0,m,r)$ with a collision-free hash function H, with 0 serving as a tag indicating input for the commitment scheme.

In at least some embodiments, the redactable signature method described in co-pending U.S. patent application titled, "Audit-log Integrity Using Redactable Signatures," having application Ser. No. 11/555,278 is used. For each subdocument $m_i$, a random value $r_i$ is computed by the data owner. The commitment values $h_i=C(m_i, r_i)$ for all $i \in [1, n]$ are arranged as the leaf nodes of a binary tree. The data owner computes a Merkle hash tree and signs the root hash y. If a user receives a document with $m_i$ redacted, the user is given the commitment value $h_i=C(m_i, r_i)$ along with random values needed to recompute the root hash and verify the data owner's signature.

The random values are chosen using a pseudorandom generator for generating pseudorandom numbers, e.g., a pseudorandom generator as described in Goldreich, Goldwasser, and Micali, "How to construct random functions," Journal of the ACM, 33(4): 792-807, 1986. In order to reduce the storage and transmission costs of n random values, a random seed s is selected and a binary tree is built from the root, denoted by s, to the leaves, adapting the GGM tree construction. Specifically, given that s is k bits long, the pseudorandom generator is used to expand s to a 2 k-bit subdocument, and the first and second k bits form, respectively, the left and the right children of s. The expansion and construction of the binary tree is continued until n leaves are obtained and $r_1, \ldots, r_n$ denote the resulting list of leaves.

Similar to the system of co-pending application Ser. No. 11/555,278, FIG. 1 depicts at least a portion of a computer system 100 and a verification system 101 in conjunction with which an embodiment may be used to advantage. Computer system 100 comprises a record generator 102, e.g., an intrusion detection application monitoring access to the computer system and command execution, or any set of instructions able to cause the generation of an audit record or device configured to cause the generation of an audit record, and an integrity and pseudonymization (IAP) system 104 according to an embodiment receiving an audit record set 106 generated by the record generator. IAP system 104 generates an audit log 108 stored in storage 110 based on records received from record generator 102. IAP system 104 comprises a buffer 112 usable in generating audit log 108. In some embodiments, audit log 108 is an append-only database.

In some embodiments, IAP system 104 operates on the same computer system as record generator 102. In some embodiments, IAP system 104 operates remote from the computer system comprising record generator 102. In some embodiments, audit log 108 and IAP system 104 reside on the same computer system 100 and in some other embodiments, the audit log and the IAP system reside on different computer systems. In some embodiments, record generator 102 comprises buffer 112. In some embodiments, IAP system 104 may comprise hardware, software, and/or firmware executable upon and/or integrated as a part of one or more computer systems.

IAP system 104 stores received audit record set 106 in buffer 112 prior to performing integrity and pseudonymization processing on the audit record and generating a "verifiable" and "pseudonymizable" audit record set 114 for storage in audit log 108. The use of the term verifiable is meant to describe an audit record set in which the integrity of the audit record set 114 and/or a subset of the audit record set is able to be independently verified, e.g., by verification system 101. The use of the term pseudonymizable is meant to describe an audit record set in which one or more portions, e.g., subdocuments, words, paragraphs, records, etc., of the audit record set may be replaced with an alternative name or pseudonym while retaining the verifiable nature of the integrity of the audit record set 114 and/or a subset of the audit record set. In some embodiments, audit record set 106 comprises one or more audit records generated by record generator 102. After generation of a verifiable and pseudonymizable audit record set 114, verification system 101 may verify the integrity of the generated verifiable and pseudonymizable audit record set. In some embodiments, verification system 101 may be a part of computer system 100.

Verification system 101 retrieves a verifiable and pseudonymizable audit record set 114 from audit log 108 and verifies the integrity of the verifiable and pseudonymizable audit record set. In some embodiments, verification system 101 verifies the integrity of a redacted version of the verifiable audit record set 114. Generation and verification of verifiable audit record set 114 and a redacted version of the verifiable audit record set is described in conjunction with co-pending application Ser. No. 11/555,278 which is incorporated herein by reference in its entirety.

First Pseudonymization Protocol

A first pseudonymization protocol embodiment is described, in which the data owner specifies pseudonyms for subdocuments of a given document, M, comprising n subdocuments $(m_1, \ldots, m_n)$.

To support pseudonyms, the computation of a hash value to sign will depend on pseudonyms chosen by the data owner. Let $p_i$ denote the pseudonym of subdocument $m_i$. For each $m_i$, the data owner computes hash value $h_i = H(x_i, p_i)$, where $x_i = C(m_i, r_i)$ is the commitment of $m_i$ with random secret $r_i$. The data owner constructs the list of $h_i$ values, hashes the list, and signs the resulting hash value. To pseudonymize $m_i$ with pseudonym $p_i$, the redactor transmits to the user the pseudonymized document, commitment $x_i$, and random values needed for computing the final hash value, similar to the redaction operation in the original redaction scheme described in the co-pending application Details are as follows:

Setup: A collision-free hash function H, a secure commitment scheme C, a secure pseudo-random generator, and a secure signature scheme S are chosen for the global system.

The data owner performs the following:

Generate a public-private key pair (PK, SK).

Publish PK (or register the PK as part of a PKI) and retain private key SK.

Sign: The data owner performs the following:

Choose a pseudonym $p_i$, for each subdocument $m_i (i \in [1, n])$ in the document M. Let $P=(p_1, \ldots, p_n)$. The data owner is responsible for choosing pseudonyms that are consistent, i.e. if $m_i = m_j$ then $p_i = p_j$.

Choose a random seed s and generates n pseudorandom numbers $r_1, \ldots, r_n$ by constructing a GGM tree.

For all $i \in [1, n]$, compute, commitment value $x_i = C(m_i, r_i)$ and then hash value $h_i = H(x_i, p_i)$.

Compute $y = H(h_1, \ldots, h_n)$.

Sign y with the private key SK, with resulting signature value $\sigma$.

Transmit the following information to the redactor in a secure channel: $(\sigma, M, P, s)$. It is assumed that an adversary can neither obtain nor modify the information transmitted in the secure channel.

Pseudonymize: A user requests the document M and based on the user's privileges, the redactor releases a pseudonymized version of M. The redactor has received the following information from the data owner: $(\sigma, M, P, s)$. Let L denote the list of indices of subdocuments to be pseudonymized in document M.

The redactor constructs the GGM tree from random seed s, and obtains n pseudorandom values $r_1, \ldots, r_n$. Let $M' = \{m_j | j \notin L\}$ denote the list of subdocuments not to be pseudonymized, and let $R = \{r_j | j \notin L\}$ denote the corresponding list of pseudorandom values. The redactor computes G, the minimum set of nodes of the GGM tree whose set of descendants in the tree covers R.

The redactor computes $x_i = C(m_i, r_i)$ and then $h_i = H(x_i, p_i)$ for $i \in [1, n]$, and then constructs a Merkle hash tree over $h_1, \ldots, h_n$, Let $Q = \{x_i | i \in L\}$ denote the list of commitment values corresponding to redacted subdocuments.

The redactor transmits to the user the following information: $(\sigma, M', L, P, G, Q)$.

Verify: Given $(\sigma, M', L, P, G, Q)$, the user verifies the pseudonymized document as follows:

Use G to compute the set of random leaves $R = \{r_j | j \notin L\}$ corresponding to non-pseudonymized subdocuments, use each $r_j$ to compute $x_i = C(m_i, r_i)$ and then $h_i = H(x_i, p_i)$.

For each $i \in L$ corresponding to a pseudonymized subdocument, take $x_i$ from the list Q and compute $h_i = H(x_i, p_i)$.

Compute $y = H(h_1, \ldots, h_n)$, and verify $\sigma$ as a correct signature of y with respect to PK, the public key of the data owner. The pseudonymized document is accepted if the signature verification is successful, and rejected otherwise.

Figure 2:
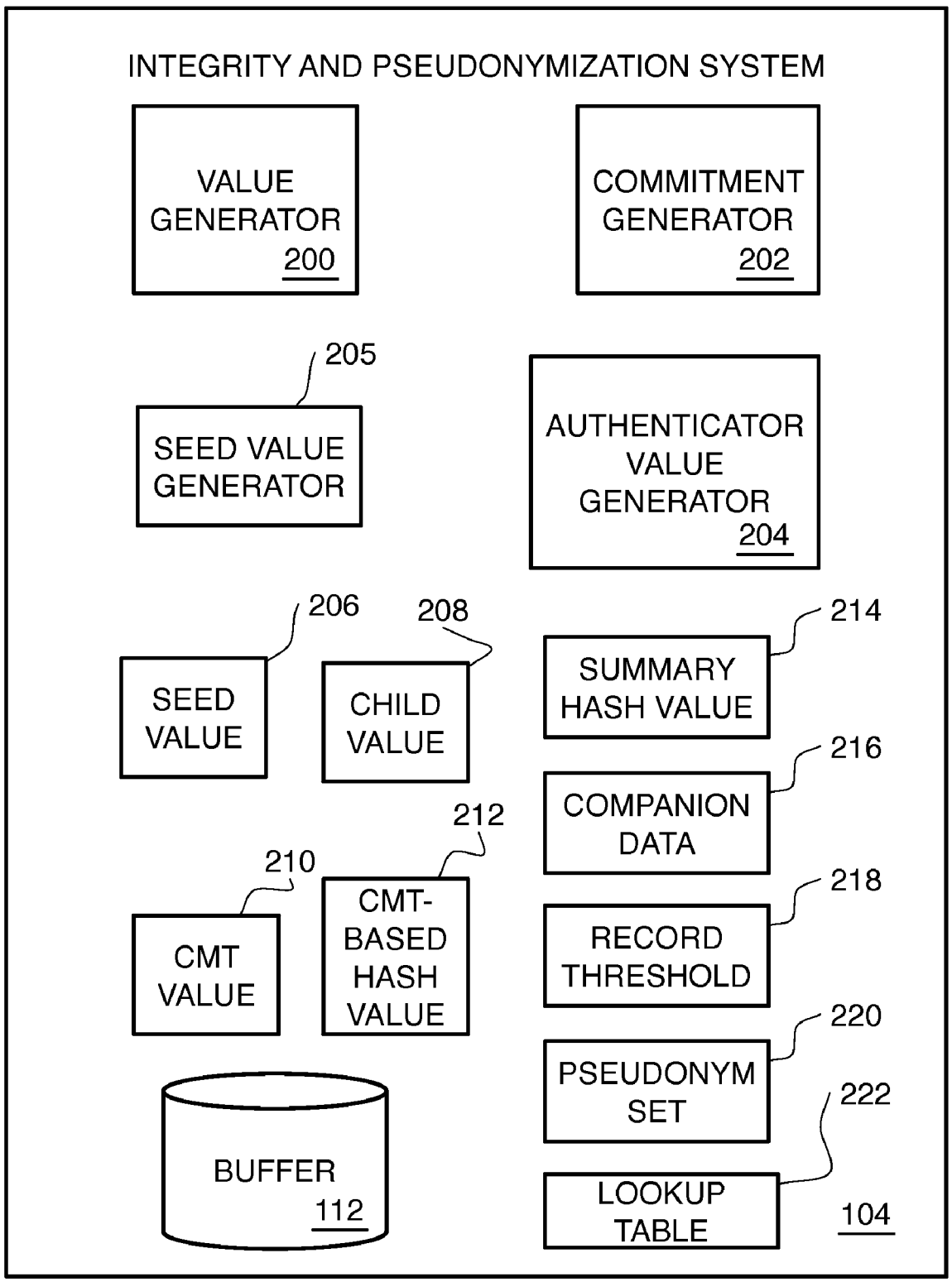
FIG. 2 is a high level functional block diagram of an integrity and pseudonymization system according to an embodiment.
Figure 3:
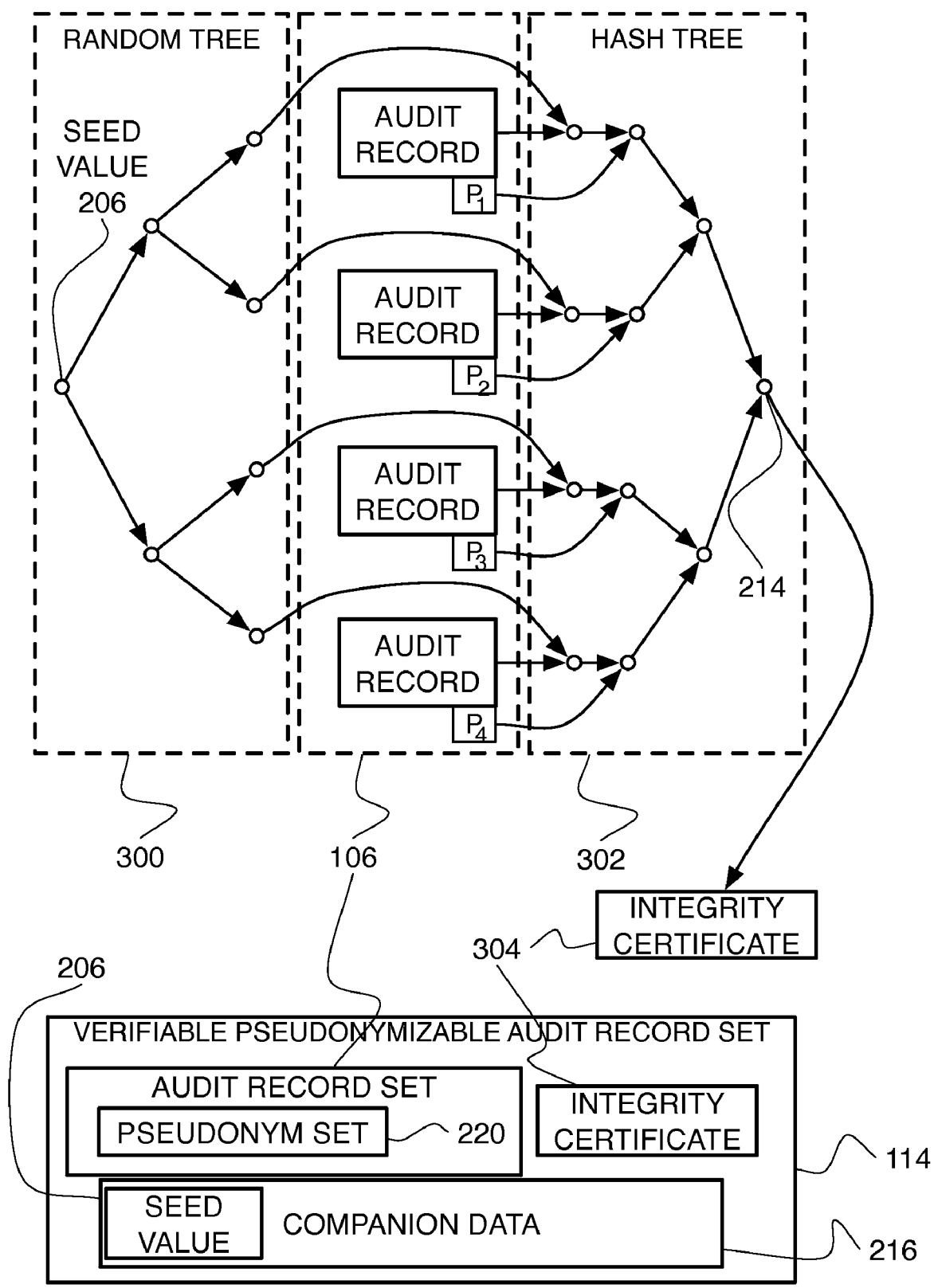
FIG. 3 is a high level block diagram of a verifiable, pseudonymizable audit record set according to an embodiment.

FIG. 3 depicts a high level block diagram of generation of a verifiable and pseudonymizable audit record set 114 according to an embodiment. FIG. 3 depicts a received audit record set 106 (dashed outline). IAP system 104 generates a random or pseudo-random tree 300 (dashed outline), e.g., a Goldreich, Goldwasser, and Micali (GGM) binary tree, based on a random or pseudo-random seed value 206 (FIG. 2), as indicated. Random tree 300 comprises a number of leaf nodes corresponding to the number of audit records in audit record set 106. In some embodiments, random tree 300 may comprise greater or lesser number of intermediate nodes between seed value 206 and the leaf nodes of the random tree. In some embodiments, random tree 300 may be a set of randomly generated values.

In accordance with the present embodiment, audit record set 106 comprises a pseudonym set 220 (FIG. 2) wherein the four audit records correspond to pseudonyms $P_1$, $P_2$, $P_3$, $P_4$, respectively. In at least some embodiments, IAP system 104 generates each pseudonym P for each audit record in audit record set 106. In at least some embodiments, a user supplies, or causes to be generated, a set of pseudonyms for use with each audit record.

After generation of random tree 300, IAP system 104 generates a hash tree 302 (dashed outline), e.g., a Merkle hash tree, with leaves generated by application of a commitment scheme to each audit record and the corresponding leaf node of random tree 300. Further, in accordance with the present embodiment, hash tree 302 further comprises leaves generated by application of a hash function to each leaf generated at the first level (i.e., leaves generated by application of a commitment scheme to each audit record and the corresponding leaf node of random tree 300) and the corresponding pseudonym of the audit record. Hash tree 302 comprises a summary hash value 214 (FIG. 2) at the root of the hash tree. In some embodiments, hash tree 302 may comprise greater or lesser number of intermediate nodes between leaf nodes of the hash tree and summary hash value 214. In some embodiments, hash tree 302 may instead be a set or a list of hash values and the hash of the set or list.

IAP system 104 applies a certifying process to summary hash value 214 to generate an integrity certificate 304 for the audit record set 106. The certifying process applied by IAP system 104 may comprise a signing portion of a digital signature process and/or a certifying portion of a time-stamp process. IAP system 104 generates an initial (i.e., unredacted and unpseudonymized) verifiable and pseudonymizable audit record set 114 comprising companion data 216 further comprising seed value 206, audit record set 106, pseudonym set 220, and integrity certificate 304. IAP system 104 stores verifiable and pseudonymizable audit record set 114 in storage 110. In this manner, a verifiable and pseudonymizable audit record set may be generated by IAP system 104 based on an audit record set 106.

In order to verify the integrity of initial verifiable and pseudonymizable audit record set 114, verification system 101 uses a given seed value from the companion data of the audit record set being verified to construct a new random tree and applies the commitment scheme to each audit record of the audit record set being verified and the corresponding leaf node of the newly constructed random tree to generate a set of commitment values. A hash function is applied to each of the generated set of commitment values along with the corresponding pseudonym $P_i$ ($P_1$, $P_2$, etc.) of the pseudonym set 220 to generate a new hash tree having a summary hash value or root 214. Verification system 101 then verifies the integrity certificate 304 based on application of verification techniques to the newly generated summary hash value of the newly generated hash tree. The verification technique applied depends on whether the integrity certificate resulted from a signing portion of a digital signature process and/or a certifying portion of a time-stamp process.

Figure 4:
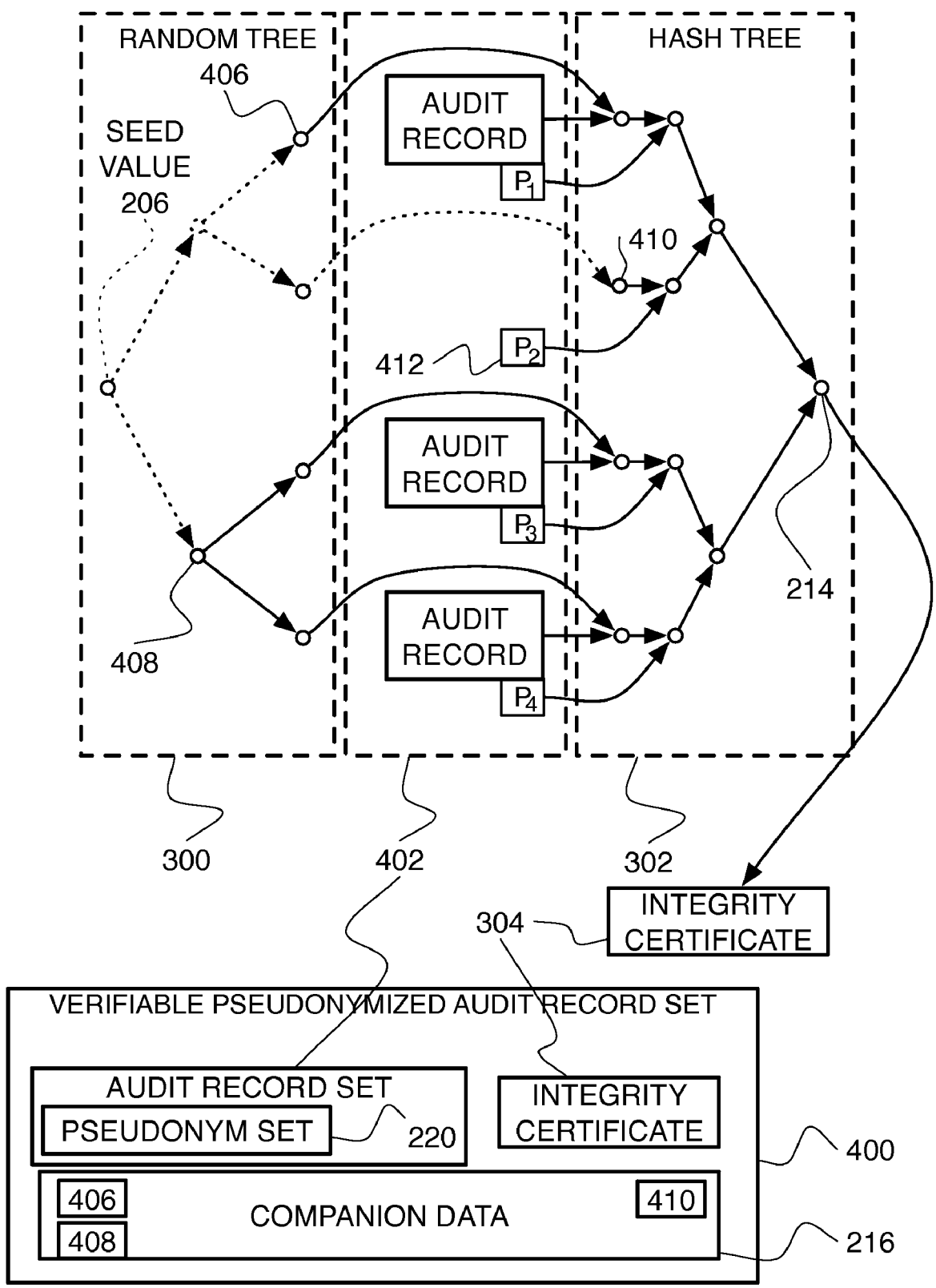
FIG. 4 is a high level block diagram of generation of a pseudonymized verifiable, pseudonymizable audit record set according to an embodiment.

FIG. 4 depicts a high level block diagram of generation of a pseudonymized verifiable pseudonymized audit record set 400 based on a pseudonymized audit record set 402, which is a pseudonymized version of audit record set 106 according to the present embodiment. Pseudonymized audit record set 402 comprises audit record set 106 less one of the audit records which has been pseudonymized from the set and replaced with pseudonym 412. Because of the pseudonymization of an audit record from the audit record set, IAP system 104 generates a verifiable and pseudonymized audit record set 400 comprising companion data 216, redacted audit record set 402, and integrity certificate 304. Companion data 216 comprises exactly the set of intermediate nodes remaining in tree 300 which generate subtrees whose leaves correspond to the remaining audit records 402, i.e., nodes 406 and 408 and not seed value 206. Companion data 216 also comprises a set of leaf nodes of hash tree 302 corresponding to the pseudonymized audit record, i.e., 410, and a pseudonym 412 corresponding to the pseudonymized audit record 410.

In order to verify the integrity of pseudonymized audit record set 402 in a given verifiable and pseudonymized audit record set 400, verification system 101 uses companion data 216, i.e., nodes 406 and 408, from the pseudonymized version of the audit record set being verified in conjunction with pseudonymized audit record set 402 to generate a set of commitment values. Verification system 101 is able to recreate hash tree 302 using the generated set of commitment values, the set of leaf nodes of hash tree 302 corresponding to the pseudonymized audit record, ie., node 410, and pseudonym 412 of the audit record set being verified. Verification system 101 is then able to verify the integrity certificate 304 using summary hash value 214 of the recreated hash tree 302 as described above.

Second Pseudonymization Protocol

In a second embodiment, commitment values for subdocuments may be used as pseudonyms for the subdocuments.

First, the case where all of the subdocuments are distinct is considered. The algorithm uses the redactable signature algorithm described in co-pending U.S. patent application titled, "Audit-log Integrity Using Redactable Signatures," having application Ser. No. 11/555,278. However, each commitment value $C(m_k, r_k)$ is used as the pseudonym for the corresponding subdocument $m_k$ In order to pseudonymize subdocument $m_k$, the redactor follows the procedure that the previous protocol used in order to redact subdocument $m_k$.

Next, the case where an individual subdocument may occur multiple times in the document is considered. In at least some embodiments, the algorithm just described may not be applied directly because of the danger that a repeated subdocument may be given inconsistent pseudonyms, since each occurrence is paired with a commitment value computed using a different random number. In this case, a procedure is employed as follows.

Suppose there are t unique subdocuments. Then we can use a GGM tree to generate I random numbers, $r_1, \ldots, r_t$, one for each unique subdocument. The data owner then builds a lookup table that defines, for each $k \in [1, n]$, the index of the pseudorandom value corresponding to subdocument $m_k$. The above algorithm can then be applied by using the commitment for $m_k$ based on the pseudorandom value $r_j$, where j is the value of the lookup table at entry k. In addition, the data owner signs the lookup table along with the root of the Merkle tree. Similarly, the redactor computes the same lookup table when computing pseudonyms. The verifier includes the lookup table as part of its verification process.

Figure 5:
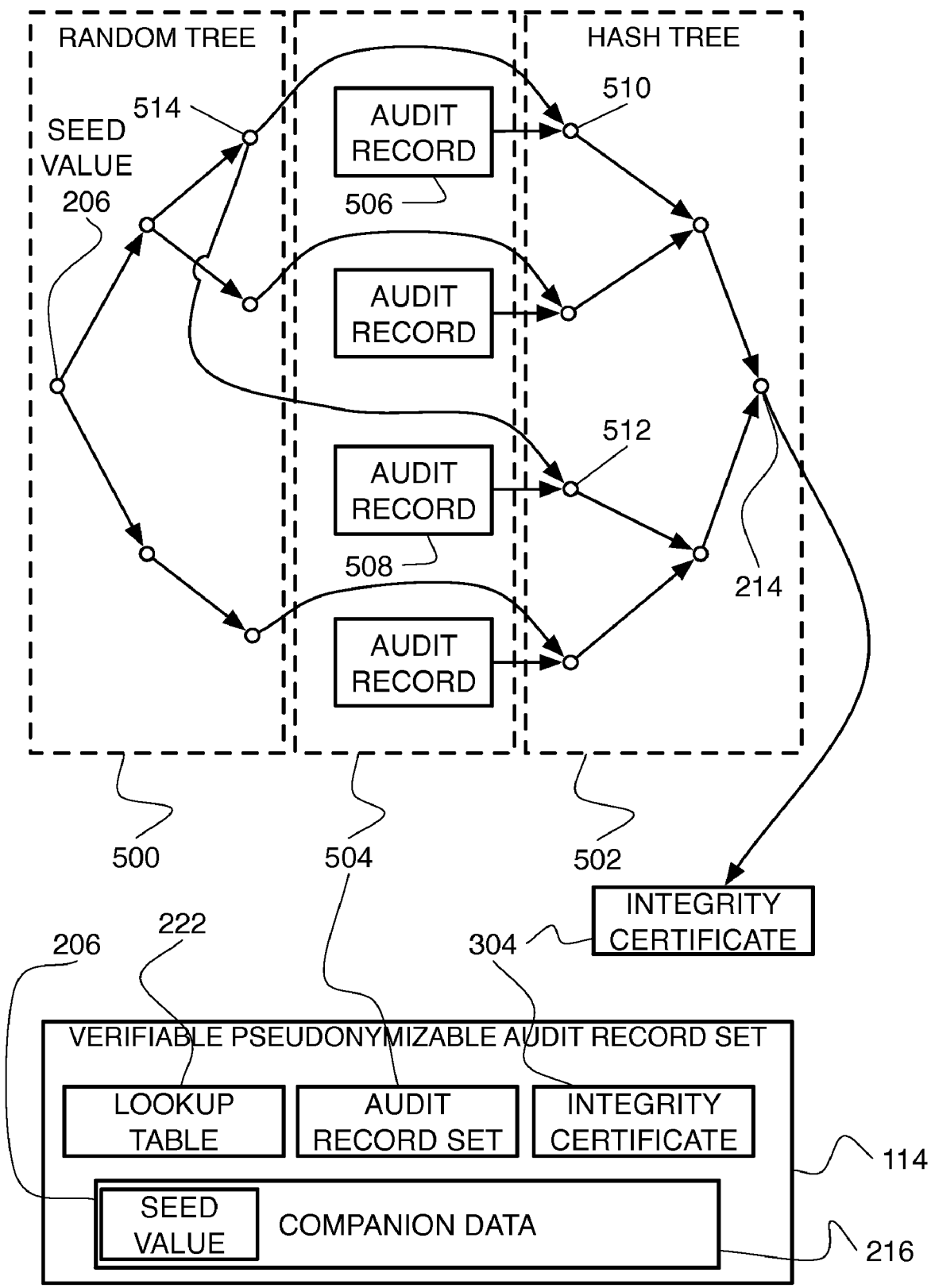
FIG. 5 is a high level block diagram of a verifiable, pseudonymizable audit record set according to another embodiment.

FIG. 5 depicts a high level block diagram of generation of a verifiable and pseudonymizable audit record set 114 according to the ad hoc protocol embodiment. FIG. 5 depicts a received audit record set 504 (dashed outline) similar to audit record set 106 wherein an audit record 506 comprises the same content as audit record 508. IAP system 104 generates a random or pseudo-random tree 500 (dashed outline), e.g., a GGM binary tree, based on a random or pseudo-random seed value 206 (FIG. 2), as indicated. Random tree 500 comprises a number of leaf nodes corresponding to the number of unique audit records in audit record set 106, i.e., audit record 506 and audit record 508 are counted as a single unique audit record. In some embodiments, random tree 500 may comprise greater or lesser number of intermediate nodes between seed value 206 and the leaf nodes of the random tree. In some embodiments, random tree 500 may be a set of randomly generated values.

A lookup table 222 comprises the set of leaf nodes of random tree 500 corresponding to unique audit records. In at least some embodiments, lookup table 222 comprises an indexed set of leaf nodes of random tree 500 wherein the index of the leaf node corresponds to the particular audit record such that the leaf node for a particular audit record may be determined based on the index of the audit record and the lookup table.

After generation of random tree 500, IAP system 104 generates a hash tree 502 (dashed outline), e.g., a Merkle hash tree, with leaves generated by application of a commitment scheme to each audit record and the corresponding leaf node of random tree 500. In accordance with the present ad hoc embodiment, application of the commitment scheme to audit records comprising identical content, e.g., audit records 506, 508, is performed using the audit record and the same leaf node of random tree 500. That is, the value generated at leaf node 512 is based on a leaf node random value 514 for audit record 506. Each node 510 and 512 is generated based on leaf node random value 514 and the appropriate corresponding audit record 506, 508. In at least some embodiments, node 510 is generated based on leaf node random value 514 and corresponding audit record 506 and, after determining that audit record 506 and 508 content are identical, node 512 is created as a copy of node 510.

Hash tree 502 comprises a summary hash value 214 (FIG. 2) at the root of the hash tree. In some embodiments, hash tree 502 may comprise greater or lesser number of intermediate nodes between leaf nodes of the hash tree and summary hash value 214. In some embodiments, hash tree 502 may instead be a set or a list of hash values and the hash of the set or list.

IAP system 104 applies a certifying process to summary hash value 214 to generate an integrity certificate 304 for the audit record set 504. The certifying process applied by IAP system 104 may comprise a signing portion of a digital signature process and/or a certifying portion of a time-stamp process. IAP system 104 generates an initial (i.e., unredacted and unpseudonymized) verifiable and pseudonymizable audit record set 114 comprising companion data 216 further comprising seed value 206, audit record set 504, lookup table 222, and integrity certificate 304. IAP system 104 stores verifiable and pseudonymizable audit record set 114 in storage 110. In this manner, a verifiable and pseudonymizable audit record set may be generated by IAP system 104 based on an audit record set 504.

In order to verify the integrity of initial verifiable and pseudonymizable audit record set 114, verification system 101 uses a given seed value from the companion data of the audit record set being verified to construct a new random tree and applies the commitment scheme to each audit record of the audit record set being verified, and the corresponding leaf node of the newly constructed random tree to generate a new hash tree. Verification system 101 then verifies the integrity certificate 304 based on application of verification techniques to the newly generated summary hash value of the newly generated hash tree. The verification technique applied depends on whether the integrity certificate resulted from a signing portion of a digital signature process and/or a certifying portion of a time-stamp process.

Figure 6:
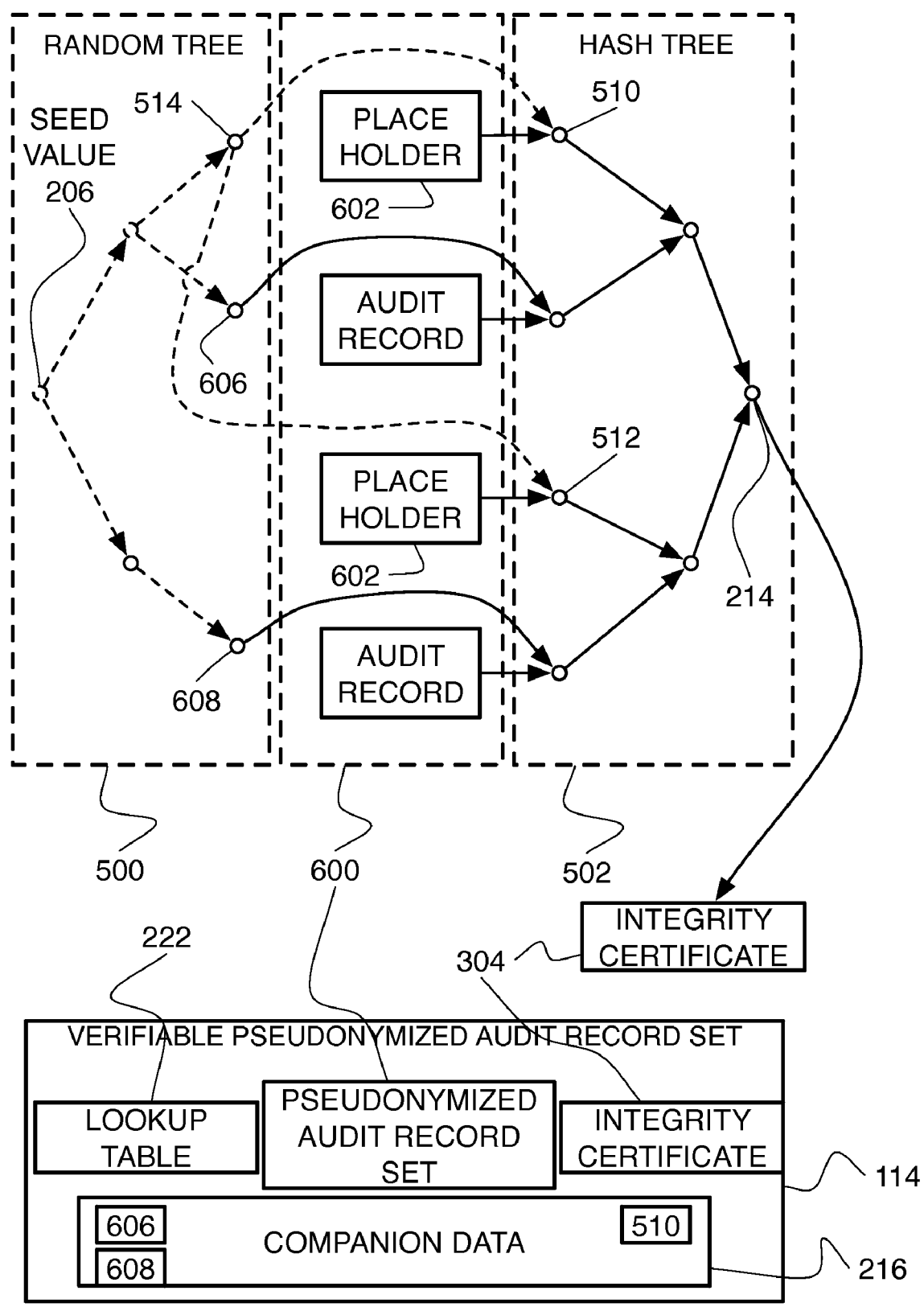
FIG. 6 is a high level block diagram of generation of a pseudonymized verifiable, pseudonymizable audit record set according to another embodiment.

FIG. 6 depicts a high level block diagram of generation of a pseudonymized verifiable pseudonymized audit record set 114 based on a pseudonymized version 600 of audit record set 106 according to the present ad hoc embodiment. Pseudonymized audit record set 600 comprises audit record set 504 less two of the audit records which have been pseudonymized from the set and each replaced with an identical placeholder symbol 602. In this example, both audit records 506, 508 have been pseudonymized because the content is identical in the two audit records. Because of the pseudonymization of the audit records from the audit record set, IAP system 104 generates a verifiable and pseudonymized audit record set 114 comprising companion data 216, pseudonymized audit record set 600, lookup table 222, and integrity certificate 304. Companion data 216 comprises the set of leaf nodes remaining in tree 500 corresponding to the remaining audit records, i.e., 606 and 608. That is, nodes 606 and 608 correspond to the set of intermediate nodes remaining in tree 500 which generate sub trees whose leaves correspond to the remaining non-pseudonymized audit records. Companion data 216 also comprises a set of leaf nodes of hash tree 502 corresponding to the pseudonymized audit records, i.e., 510, 512. In this example, companion data 216 comprises node 510 because node 512 is identical to node 510.

In order to verify the integrity of pseudonymized version 600 of an audit record set in a given verifiable and pseudonymized audit record set, verification system 101 uses companion data from the pseudonymized version of the audit record set being verified in conjunction with pseudonymized audit record set 600 to generate a new hash tree and summary hash value. Verification system 101 is able to recreate hash tree 502 using the pseudonymized audit record set 600 and the companion data of the audit record set being verified along with lookup table 222. Verification system 101 is then able to verify the integrity certificate 304 as described above.

Third Pseudonymization Protocol

Another embodiment makes use of redactable signature algorithm described in co-pending U.S. patent application titled, "Audit-log Integrity Using Redactable Signatures," having application Ser. No. 11/555,278. According to this particular embodiment, a second set of GGM and Merkle trees, separate from the first set of GGM and Merkle trees used to handle the document, is used to handle the pseudonyms. To pseudonymize a document, the redactor redacts the subdocuments to be pseudonymized from the first set of trees and redacts the pseudonyms that are not used from the second set of trees. The user then constructs the pseudonymized document from the appropriate values in the two trees. In at least some embodiments, the two sets of trees may be constructed so that they form the first and second halves of a single set of trees.

Details of the algorithm are as follows:

Setup: Same as in Setup of the first pseudonymization protocol embodiment.

Sign: The data owner performs the following:

Choose a pseudonym $p_i$, for each subdocument $m_i$ ($i \in [1, n]$) in the document M. q is a vector of length 2n, where $q_i = m_i$ and $q_{i+n} = p_i$ for $i \in [1, n]$.

$(r_1, \ldots, r_{2n})$ denotes the set of leaves of a GGM tree computed from a seed s. For each $i \in [1, 2n]_i$, the data owner computes $x_i = C(q_i, r_i)$. Next, the data owner builds a Merkle hash tree from $(x_1, \ldots, x_{2n})$ to form a root value y, and signs the root value with the private key SK, to obtain a signature $\sigma$. In at least some embodiments, the data owner sends $(q, s, \sigma)$ to the redactor using a secure channel. In at least some embodiments, it is assumed that an adversary is unable obtain the information transmitted in the secure channel.

Pseudonymize: A user requests the document M. Based on a given policy, the redactor releases a pseudonymized version of M. Specifically, L is the list of indices of subdocuments to be pseudonymized in document M. The redactor constructs the GGM tree from random seed s, and obtains 2n pseudorandom numbers $r_1, \ldots, r_{2n}$.

Let $M' = \{m_k | k \in [1,n], k \notin L\}$ $P = \{p_k | k \in [1,n], k \in L\}$ $R_m = \{r_k | k \in [1,n], k \notin L\}$ $R_p = \{r_k | k \in [n+1, 2n], k \in L\}$ $C_m = \{C(m_k, r_k) | k \in [1,n], k \in L\}$ $C_p = \{C(p_k, r_{k+n}) | k \in [1,n], k \notin L\}$ Compute G as the minimum set of subroots of the GGM tree that cover $R_m \cup R_p$, and D as the minimum set of subroots of the Merkle tree that cover $C_m \cup C_p$.

Sends to the user the set (L, M', P, G, D, $\sigma$).

The additional space overhead of the algorithm is due to the size of the sets G and D, which is logarithmic in |L|.

Verify: The user expands each of the subroots in G to reconstruct $R_m$ and $R_p$. From these values, the user computes the commitments:

$C_m' = \{C(m_k, r_k) | k \in [1,n], k \notin L\}$ $C_p' = \{C(p_k, r_{k+n}) | k \in [1,n], k \in L\}$ The user combines the computed commitments with the subroots in D to find the root of the Merkle tree, and verifies the correctness of $\sigma$ as a signature on that root with the respect to the public key PK of the data owner.

The algorithm described above assumes that the redactor wants to keep unused pseudonyms secret from the user. Thus, in at least some embodiments, randomized commitments are used to hide the unused values from the user. In at least some embodiments, secrecy of pseudonyms is not a requirement and the last n random values are not computed, and the input to the Merkle tree comprises direct hashes of the pseudonyms.

The algorithm does not allow the user to further pseudonymize the document, since only the set of pseudonyms used is provided to the user. In at least some embodiments, the algorithm is modified to allow the user to further pseudonymize the document. In the modified embodiment, if L' represents an additional set of pseudonym indices that the user uses to further pseudonymize the document, then $L \cup L'$ is substituted in the computation of P, $R_p$, and $C_p$ above. Given this information, the user is able to act as a redactor and follow the protocol to further pseudonymize the document.

Arbitrary Pseudonyms For Display

In some embodiments, pseudonyms are commitment values, which may be long (e.g. 160 bits) and adversely affect the readability of a document. In accordance with a further pseudonymization protocol embodiment, the second pseudonymization protocol embodiment described above is adapted so that a redactor can generate an arbitrary pseudonym for a subdocument, without the participation of the data owner.

The protocol makes use of a symmetric encryption algorithm, with encryption and decryption procedures E and D, respectively. Let $E_k(m)$ denote the encryption of a message m with key k, and $D_k(c)$ the decryption of ciphertext c with key k.

For subdocument $m_i$, let $r_i$ denote the associated random value, and let $c_i = C(m_i, r_i)$ denote the associated commitment value. For this subdocument, the redactor selects an arbitrary pseudonym $p_i$.

In operation Pseudonymize, the redactor computes a hash value $k=H(p_i)$, and then uses k as a key to encrypt commitment value $c_i$, by computing $x_i = E_k(c_i)$. $p_i$ is used as the pseudonym of $m_i$ in the document, and $x_i$ is also provided to the user for the verification of integrity. The rest of the computation is the same as in the second pseudonymization protocol.

In operation Verify, a user first computes k from pseudonym $p_i$. Then, the user uses k to decrypt $x_i$ by computing $D_k(x_i)$. This computation provides $c_i$, which is used to construct the Merkle tree as in the second pseudonymization protocol embodiment. If the data owner's signature on the root hash of the newly constructed Merkle tree is successfully verified, the user performs two additional checks:

1. For all the pseudonyms that are associated with the same commitment value $c_i$, the user checks that all the pseudonyms are identical.

2. For all occurrences of a pseudonym $p_i$, the user checks that they are all associated with the same commitment value.

The first check confirms the consistency of key k for all pseudonyms with the same hash values and ensures that no adversary has selectively replaced some but not all occurrences of a pseudonym. The second check ensures that different leaf values in the Merkle hash tree correspond to different pseudonyms or subdocuments, which prevents the use of the same pseudonym for two different subdocuments. The integrity verification succeeds if all the checks are successful, and fails otherwise.

Besides the integrity verification of outsourced content publishing, embodiments of the present approach are general enough for proving historic persistency. In these embodiments, the prover, such as a financial organization, proves the integrity of pseudonymized data over time. The verifier checks, at the current time, the integrity of a pseudonymized document obtained in a previous time period. For example, in case of military or political disputes, the government can prove in a court of law that the pseudonymized document released to the public at some time is consistent with the original document when it was first created at a previous time. A historic document may also be pseudonymized and the resulting content verified against historic commitments generated by the data owner at previous time periods.

What is claimed is:

1. A method of generating a pseudonymizable document, comprising, with a processor of a computer system:
   receiving a set of subdocuments, wherein each subdocument is a portion of a first document that is to be converted into said pseudonymizable document;
   generating a first set of random values wherein each subdocument in the document corresponds to at least one of the first set of random values;
   generating a second set of values each based on a subdocument in the document and a corresponding value of the first set of random values;
   generating a set of pseudonyms wherein one or more subdocuments in the document corresponds to at least one pseudonym of the pseudonym set;
   generating a third set of values based on the second set of values and the pseudonym set; and
   generating a summary value based on the third set of values.

2. The method of claim 1, further comprising:
   certifying the summary value to generate an integrity certificate enabling verification of the integrity of the pseudonymizable document; and
   storing the document and at least one of the first set of random values, the pseudonym set, and the integrity certificate.

3. The method of claim 2, wherein the generated integrity certificate comprises at least one of a public-key digital signature and a timestamp certificate.

4. The method of claim 1, wherein the generation of a second set of values comprises generating a value of the second set of values using a commitment scheme based on a value from the first set of random values and a subdocument.

5. The method of claim 1, wherein the generation of a third set of values comprises generating a value of the third set of values using a hash function based on at lease one value from the second set of values and at least one pseudonym of the pseudonym set.

6. The method of claim 1, wherein the generation of a summary value comprises generating a summary value based on at least one pseudonym of the pseudonym set and at least one value from the second set of values.

7. The method of claim 1, wherein the generation of a first set of random values comprises constructing a binary tree comprising leaf nodes corresponding to subdocuments of the first document.

8. The method of claim 1, wherein the generation of a first set of values comprises constructing a Goldreich, Goldwasser and Micali (GGM) tree.

9. The method of claim 1, wherein the generation of the summary value comprises generating a Merkle hash tree.

10. The method of claim 1, wherein the generation of a first set of random values comprises generating a first set of random values corresponding to each unique subdocument and wherein subsequent duplicate subdocuments correspond to the random value of the matching unique subdocument, and wherein the set of pseudonyms corresponds to the second set of values.

11. The method of claim 10, wherein the generation of a first set of random values comprises storing the first set of random values in an index.

12. A memory or a non-transitory computer-readable medium storing instructions which, when executed by a processor, cause the processor to perform the method of claim 1.

13. A method of verifying the integrity of a set of pseudonymized subdocuments, wherein each subdocument is a portion of a first document that is to be converted into a pseudonymizable document, said method using a first set of random values corresponding to at least a subset of the leaves of a binary tree generated based on a seed value, a second set of values each generated based on a combination of at least one value from the first set of values and at least one subdocument from the redacted document, a set of pseudonyms each corresponding to a subdocument, and an integrity certificate generated based on a verifiable document from which the pseudonymized document originated, said method comprising, with a processor of a computer system:

generating a third set of values, based on the first set of random values, wherein each subdocument corresponds to at least one value of the third set of values;

generating a fourth set of values based on: (a) a subdocument and a corresponding value from the third set of values; (b) the second set of values; and (c) at least one pseudonym of the pseudonym set, for each subdocument in the pseudonymized document;

generating a summary value based on the generated fourth set of values; and generating a signal based on a result of applying a verification process to the generated summary value and the integrity certificate.

14. A memory or a non-transitory computer-readable medium storing instructions which, when executed by a processor, cause the processor to perform the method of claim 13.

15. A system for generating a pseudonymizable document, said system comprising a computer system comprising a processor, said system further comprising:

a value generator arranged to generate: (a) a first value set comprising at least one of random and pseudo-random values each corresponding to at least one subdocument, wherein each subdocument is a portion of a first document that is to be converted into said pseudonymizable document and (b) a pseudonym set comprising a pseudonym corresponding to at least one subdocument in the first document;

a commitment generator communicatively coupled with the value generator and arranged to generate: (a) a second value set wherein each value of the second value set is based on applying a commitment scheme to a subdocument of the document and a value of the first random value set corresponding to the subdocument and (b) a third value set wherein each value of the third value set is based on applying a hash function to a value of the second value set and a pseudonym corresponding to the subdocument; and an authenticator value generator communicatively coupled with the commitment generator and arranged to generate a summary value based on the third value set.

* * * * *

UNITED STATES PATENT AND TRADEMARK OFFICE
CERTIFICATE OF CORRECTION

| | | |
|---|---|---|
| PATENT NO. | : 8,266,439 B2 | |
| APPLICATION NO. | : 11/854413 | |
| DATED | : September 11, 2012 | |
| INVENTOR(S) | : Stuart Haber et al. | |

It is certified that error appears in the above-identified patent and that said Letters Patent is hereby corrected as shown below:

In column 12, line 48, in Claim 5, delete "lease" and insert -- least --, therefor.

Signed and Sealed this
Fifth Day of February, 2013

Teresa Stanek Rea
*Acting Director of the United States Patent and Trademark Office*